United States Patent
Hung

(10) Patent No.: US 9,621,696 B2
(45) Date of Patent: Apr. 11, 2017

(54) CASING AND PROTECTIVE SHELL FOR MOBILE ELECTRONIC DEVICE

(71) Applicants: Inventec Appliances (Pudong) Corporation, Shanghai (CN); INVENTEC APPLIANCES CORP., New Taipei (TW); INVENTEC APPLIANCES (SHANGHAI) CO.,LTD., Shanghai (CN)

(72) Inventor: Kuang Hui Hung, Wugu Township, Taipei County (TW)

(73) Assignees: Inventec Appliances (Pudong) Corporation, Shanghai (CN); Inventec Appliances Corp., New Taipei (TW); Inventec Appliances (Shanghai) Co., Ltd., Shanghai (CN)

( * ) Notice: Subject to any disclaimer, the term of this patent is extended or adjusted under 35 U.S.C. 154(b) by 614 days.

(21) Appl. No.: 14/167,293

(22) Filed: Jan. 29, 2014

(65) Prior Publication Data
US 2014/0220270 A1    Aug. 7, 2014

(30) Foreign Application Priority Data
Feb. 7, 2013    (CN) .......................... 2013 1 0050701

(51) Int. Cl.
*H04M 1/18* (2006.01)
*H04B 1/3888* (2015.01)
*A45C 11/00* (2006.01)

(52) U.S. Cl.
CPC ............. *H04M 1/185* (2013.01); *A45C 11/00* (2013.01); *H04B 1/3888* (2013.01); *A45C 2011/002* (2013.01); *A45C 2011/003* (2013.01); *G06F 2200/1633* (2013.01); *Y10T 428/13* (2015.01)

(58) Field of Classification Search
CPC .... H04M 1/185; Y10T 428/13; H04B 1/3888; A45C 11/00; A45C 2011/002; A45C 2011/003; G06F 2200/1633
See application file for complete search history.

(56) References Cited

U.S. PATENT DOCUMENTS

2010/0089779 A1* 4/2010 Bowers ................ A45C 7/0095
                                                                206/320

\* cited by examiner

*Primary Examiner* — Michael C Miggins
(74) *Attorney, Agent, or Firm* — Muncy, Geissler, Olds & Lowe, P.C.

(57) ABSTRACT

The present invention relates to a casing and protective shell for a mobile electronic device. The casing includes an outer layer having a first side exposed to the outside, and a second side opposite to the first side; a flexible buffer layer having a first side connected to the second side of the outer layer, and a second side opposite to the first side of the buffer layer; and a layer for holding, which has a side connected to the second side of the buffer layer.

8 Claims, 3 Drawing Sheets

CASING AND PROTECTIVE SHELL FOR MOBILE ELECTRONIC DEVICE

CROSS-REFERENCE TO RELATED APPLICATION

This application claims the benefit of China Patent Application No. 201310050701.1, filed on Feb. 7, 2013, in the State Intellectual Property Office, the disclosure of which is incorporated herein its entirety by reference.

BACKGROUND OF THE INVENTION

1. Field of the Invention

The present invention relates to a casing and protective shell for mobile electronic device, and in particular relates to a casing and protective shell for a mobile electronic device including a structure of three layers which can keep beautiful appearance while having better ability to resist being hit or stricken.

2. Description of the Related Art

With the progression of technology, many electronic products have been developing in succession that not merely bring a more convenient life to human beings, but also more fun in life to the public. For example, the smartphones, which are leading the current market of cell phone industry, except for providing users with telecommunication, further with listening music, broadcasting films, on-line reading, application of social communication software and internet connection from common to social websites and so on to the users, the problem that the functions mentioned above have to be respectively installed into individual devices prior performing can be improved and integrated into a smartphone, enabling the user to perform multi-functions by means of a tiny device. It not only greatly promotes the living convenience, but also increases communication and exchange between people.

Every type of electronic products are all provided with shell to protect the internal circuit from being damaged, especially, such as smartphone, tablet PC and other mobile electronic devices, which are usually away from the ground with a certain height as being held by the user. Consequently, these electronic products need a strike-resistant shell to protect. However, present shells have almost only a structure of single layer having hard material, which lacks good characteristics to resist being hit or struck, so some practitioners may create a soft material structure upon the shell with single layer structure to absorb the momentums while the electronic device is falling. But creating a soft material structure upon shell will demolish the appearance in whole and have a dislike for the user, and the soft material structure will also involve in its touch, affecting the feeling, and is easily peeled when exposing to an external environment in a long period, failing to maintain its appearance with perfection.

SUMMARY OF THE INVENTION

In view of the above technical problem, an objective of the present invention is to provide a casing and protective shell for a mobile electronic device to solve the problems of a casing or protective shell having inadequate abilities to resist being hit or stricken.

In contrast to the prior art, the present invention provides a casing for a mobile electronic device, the casing including: an outer layer having a first side exposed to the outside, and a second side opposite to the first side; a flexible buffer layer having a first side connected to the second side of the outer layer, and a second side opposite to the first side of the buffer layer; and a layer for holding, which has a side connected to the second side of the buffer layer.

In an embodiment, each of the outer layer and the holding layer has hardness greater than that of the buffer layer.

In an embodiment, the casing includes a first casing part and a second casing part, each being movably connected to the other.

In an embodiment, the buffer layer has an amount of area larger than 80% of the area of the outer layer.

The present invention also provides a protective shell applicable for covering a mobile electronic device having a casing. The protective shell includes an outer layer having a first side exposed to the outside, and a second side opposite to the first side; a flexible buffer layer having a first side connected to the second side of the outer layer, and a second side opposite to the first side of the buffer layer; and a layer for holding, which has a first side connected to the second side of the buffer layer, and a second side for covering the casing of the mobile electronic device.

DETAILED DESCRIPTION OF THE PREFERRED EMBODIMENTS

Figure 1:
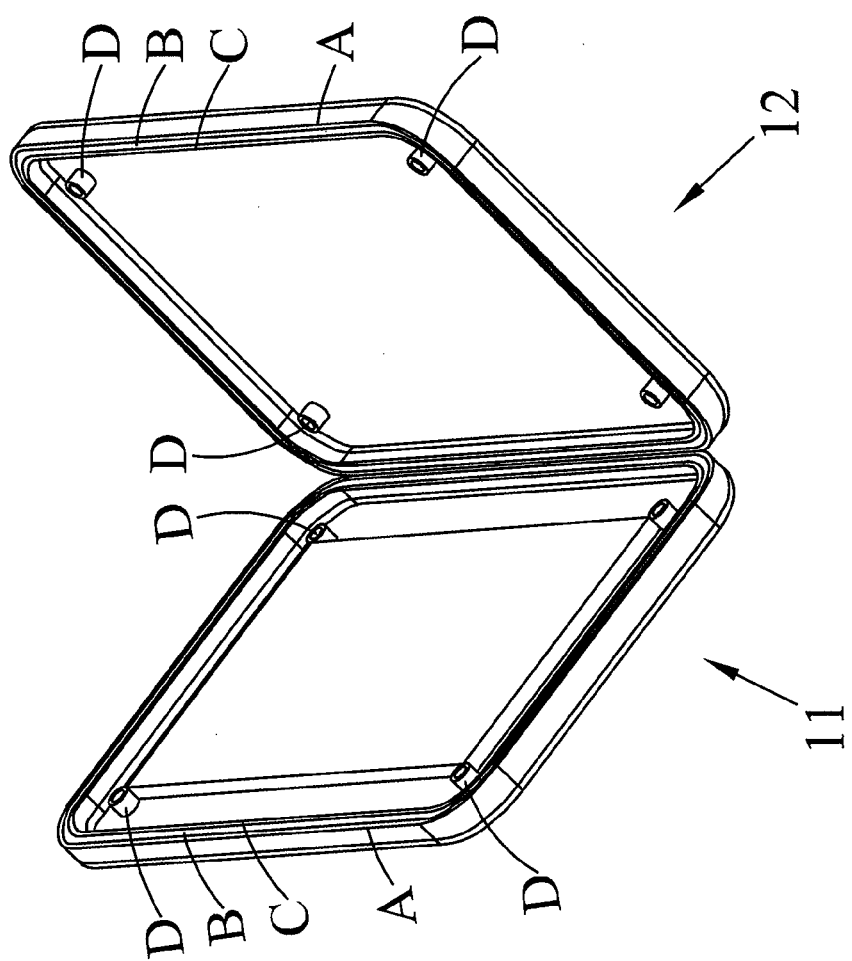
FIG. 1 is a schematic view of casing in accordance with an embodiment of the present invention.

Hereinafter, embodiments of the present invention will be described in detail with reference to the accompanying drawings so that those skilled in the art to which the present invention pertains can realize the present invention. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

With reference to FIG. 1 for a schematic view of casing in accordance with an embodiment of the present invention. A first casting part 11 and a second casting part 12 can be shown in the FIG., and the assemblage thereof can accomplish the casing 1 claimed in the present invention. The casing 1 may be applied to any mobile electronic devices, which comprise: smartphone, tablet PC, Personal Digital Assistant and so on, but shall not be subject to this restriction. The casing 1 may be formed by two-shot injection mold along with an Insert mold to perform a casing with three layers. Wherein, a first casting part 11 and a second casting part 12 both comprise an outer layer A, a buffer B and a holding layer C, and outer layer A and holding layer C may be formed by the process of the injection mold as mentioned above, a buffer layer B may be configured to be inserted between an outer layer A and a holding layer C by means of the process of the Insert mold. The buffer layer B may have an amount of area larger than 80%, 90% or 100% of the area of the outer layer, and even more than 100%, as a result, the casing 1 may accomplish better ability to resist being hit or stricken. The buffer layer B, of course, may only be disposed at an edge or corner of the outer layer A and the holding layer C, of which served as resist being hit or stricken in part and the buffer layer B may have an amount of area smaller than 80% of the area of the outer layer A at the time.

In the above-mentioned, the outer layer A and the holding layer C may be composed of Polycarbonate, Acrylonitrile Butadiene Styrene or mixture thereof, and may be the same or different materials. For example, the outer layer A may be formed of material which with greater hardness than that of the holding layer C, so that may perform better protective effect upon the outmost layer, but shall not be subject to this restriction. The holding layer C may also be formed of material which with greater hardness than that of the outer layer A, and may modify the design based on the need in practice. The buffer layer B may be formed of Thermoplastic polyurethane, Thermoplastic Rubber or the regular Rubber, but shall not be subject to this restriction. Thus it can be seen that the hardness of the outer layer A and the holding layer C is greater than that of the buffer layer B in the structure with three layers.

Furthermore, the holding layer C of a first casting part 11 and a second casting part 12 may further comprise a fixing member D, the amount of fixing member may be one or more. When the first casting part 11 and the second casting part 12 are assembling, location of the holding layer C of the first casting part 11 and the second casting part 12 will correspond to each other and couple with each other, enabling the first casting part 11 and the second casting part 12 can fix as a whole casing 1. In the embodiment, the fixing member D is a cylindrical shape and being disposed at a position where close to the middle position of the holding layer C, but shall not be subject to this restriction in practice. For example, the fixing member D may be set in outer edge of the holding layer C or the side edge of the first casting part 11 and the second casting part 12 and so on.

In the above-mentioned, after the first casting part 11 and the second casting part 12 are combined as the casing 1, the buffer layer B may serve as a mechanism to resist being hit or stricken, for absorbing the momentums while the electronic device is falling as well as protecting the inner circuit of the electronic device. In addition, if the setting of the buffer layer B has an amount of area larger than 100% or over 100% of the area of the outer layer A, after the connection of the first casting part 11 and the second casting part 12 is done, the buffer layer B of the first casting part 11 will closely contact with the buffer layer B of the second casting part 12, as a result, water-proof and dust-proof effect can be performed by means of the buffer layer B, for avoiding water or dust from entering into the inside of electronic device.

Figure 2:
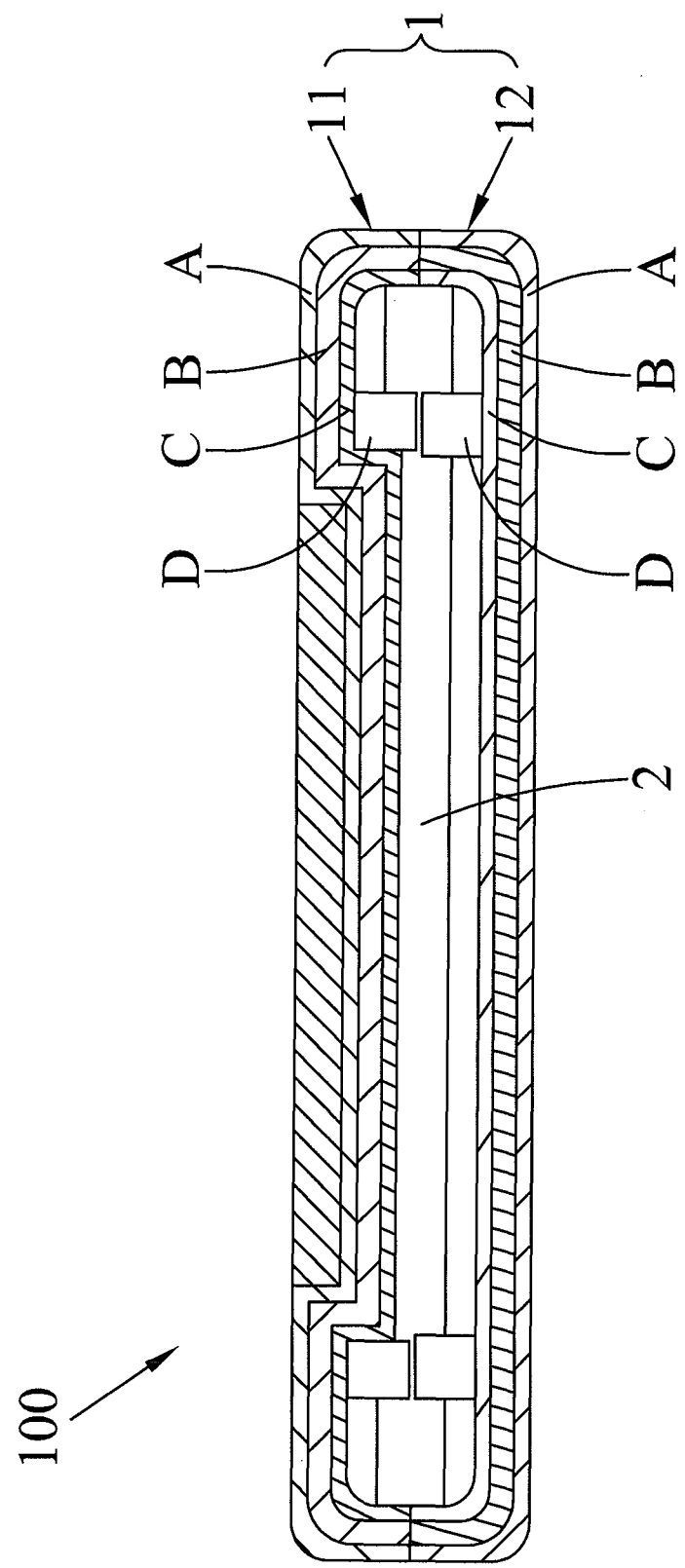
FIG. 2 is a schematic view of mobile electronic device with the casing in accordance with an embodiment of the present invention.

Please with reference to FIG. 1 along with FIG. 2, FIG. 2 is a schematic view for mobile electronic device with the casing in accordance with an embodiment of the present invention. In FIG. 2, drawing is a mobile electronic device 100 with the casing 1 as claimed in FIG. 1. The casing 1 covers the circuit board 2 of the mobile electronic device 100 along with related electronic or assembling elements. One side of the outer layer A of casing 1 being exposed to an external environment as an appearance layer. The buffer layer B of the casing 1 is connected to other side of the outer layer A which is opposite to the side exposed to the external environment as a middle layer for absorbing momentums to resist being hit or stricken, while performing the water-proof and dust-proof effect by means of the buffer layer B. The holding layer C of the casing 1 is connected to other side of the buffer layer B which is opposite to the side exposed to the outer layer A for being an inner layer to fix with circuit board 2. Wherein, the outer layer A and the holding layer C of the casing 1 may be composed of the same or different hardness material to keep a better good-looking appearance; and the buffer layer B may be composed of soft material such as rubber for being a middle layer with a better momentums-absorbing effect. Wherein, the circuit board 2 has a hole, when assembling the casing 1, the fixing member D of the first casting part 11 and the second casting part 12 will penetrate through the hole of the circuit board 2, and the fixing member D of the first casting part 11 and the second casting part 12 will couple, so that enabling the first casting part 11 and the second casting part 12 and circuit board 2 to fix with each other. By means of the casing 1 has a structure with three layers in accordance with the present invention; the inner circuit of the mobile electronic device 100 can be effectively protected, enabling the circuit board 2 and related electronic elements from being damaged when mobile electronic device 100 is hit or stricken.

Figure 3:
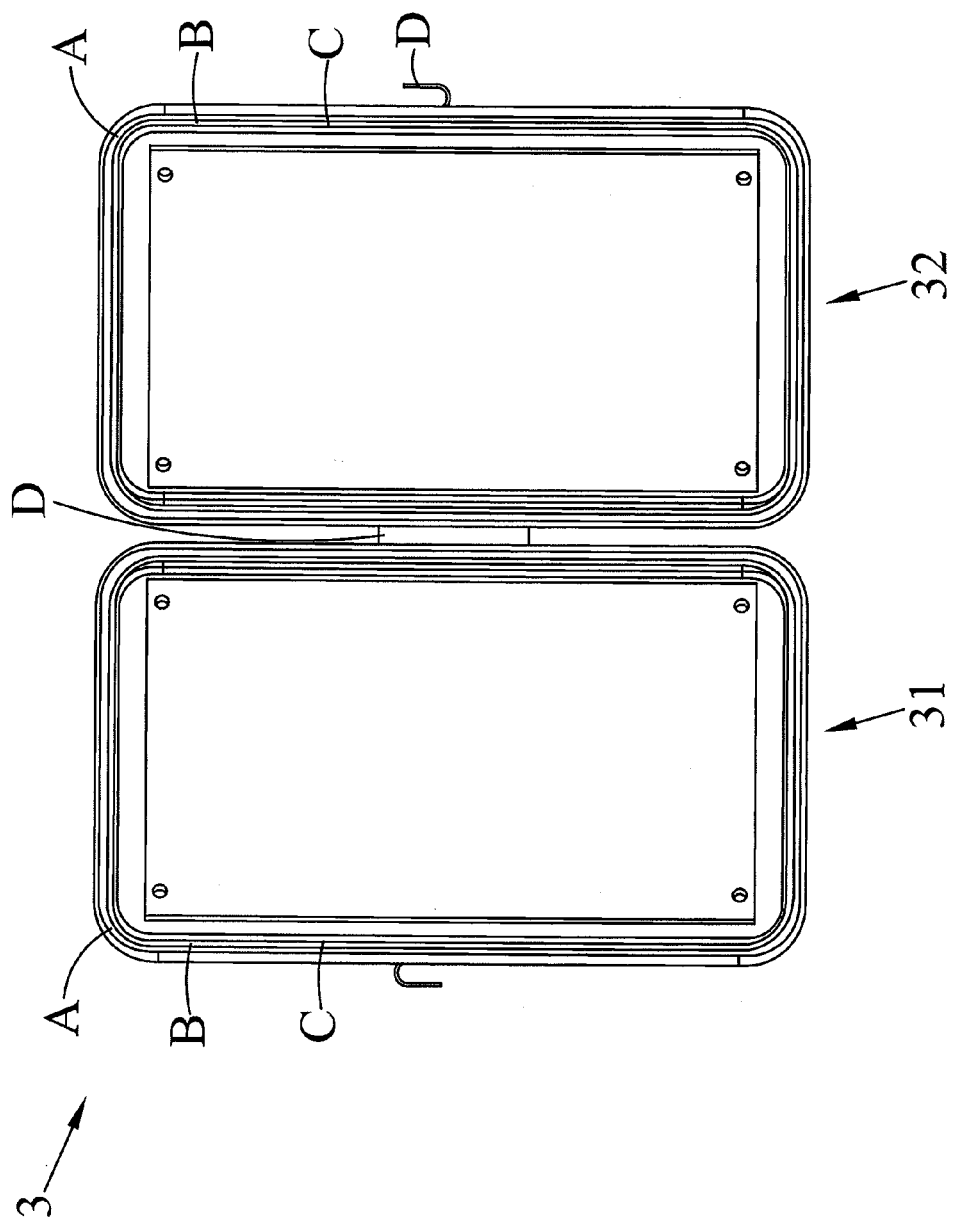
FIG. 3 is a schematic view of protective shell in accordance with an embodiment of the present invention.

With reference to FIG. 3 for a schematic view of protective shell in accordance with an embodiment of the present invention. The structure of three layers of the present invention shall not be subject to restriction against casing applied to electronic device, and may also be used in a protective shell covering mobile electronic device with casing. As can be seen in the FIG., a protective shell 3 comprises a first casting part 31 and a second casting part 32, both including the outer layer A, the buffer layer B and the holding layer C, and further having the fixing member D. The outer layer A and the holding layer C are composed of hardness material and formed by a process of injection mold. The buffer layer B is flexible, and may be configured to be inserted between the outer layer A and the holding layer C by means of the process of the Insert mold. The aforementioned buffer layer B has an amount of area larger than 80% of the area of the outer layer A, but shall not be subject to this restriction.

In the above-mentioned, when the first casting part 31 and the second casting part 32 are assembling, the fixing member D of the first casting part 31 and the second casting part 32 may connect with each other to accomplish the whole protective shell 3 and cover the mobile electronic device with casing and inner circuit. Wherein, after the connection of the first casting part 31 and the second casting part 32 is done, a side of the outer layer A is exposed to an external environment, one side of the buffer layer B is connected to the other side of the outer layer A which is opposite to the side exposed to the external environment, holding layer C being connected to the other side of the buffer layer B which is opposite to the side coupled with the other side of the outer layer A, and the buffer layer B of the first casting part 31 and the second casting part 32 will closely connect with each other. Because of the different material, the hardness of the outer layer A and the holding C may greater than that of buffer layer. Consequently, ability to resist being hit or stricken, water-proof and dust-proof effects can be achieved by means of the buffer layer B.

In summary, a casing and protective shell for a mobile electronic device of the present invention is a structure with three layers, for buffering the force from being hit or stricken in the middle layer, enabling to absorb the momentums when the electronic device is falling and protect the mobile electronic device from being damaged. In addition, after the connection of casing and protective shell is done, the middle buffer layer may demonstrate in a close shape so that water-proof and dust-proof effect can be achieved by means of the buffer layer which is composed of rubber.

Furthermore, the casing and protective shell of the present invention may (and may not) have one or more of the following advantages:

(1) The casing and protective shell for mobile electronic device of the present invention may be designed as a structure with three layers, in which the outmost layer is an appearance layer having high hardness which may keep a good-looking appearance, enabling the appearance layer may still provide with various designs. The inmost layer is a holding layer which also with high hardness, enabling the casting to fix with each other as well as tightly connects to the circuit board. The flexible buffer layer, located between the appearance layer and holding layer, absorbs the momentums while the electronic device falling. The casing and protective shell designed with a structure with three layers may have ability to resist being hit or stricken efficiently and protects the electronic device.

(2) The buffer layer used in the casing and protective shell for mobile electronic device of the present invention may be composed of such as rubber, which not only enables the casing and protective shell to have better ability to resist being hit or stricken, but also provides water-proof and dust-proof effect by means of the buffer layer, after the casing and protective shell are well-assembled.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A casing for a mobile electronic device, comprising:
   a first casing part and a second casing part, each of the first casing part and second casing part being movably connected to each other;
   the first casing part and the second casing part, comprising:
      an outer layer having a first side exposed to the outside, and a second side opposite to the first side;
      a flexible buffer layer having a first side connected to the second side of the outer layer, and a second side opposite to the first side of the buffer layer; and
      a layer for holding, the holding layer having a side connected to the second side of the buffer layer,
   wherein each of the holding layers of the first casing part and the second casing part has a fixing member, and the fixing member of each of the first casing part and second casing part is configured to be inserted through a hole on a circuit board to connect to the fixing member of an opposing casing part of the first casing part and the second casing part, such that the circuit board is firmly held between the first casing part and the second casing part.

2. The casing for the mobile electronic device of claim 1, wherein each of the outer layer and the holding layer has hardness greater than that of the buffer layer.

3. The casing for the mobile electronic device of claim 1, wherein the buffer layer of the first casing part and the buffer layer of the second casing part closely fit each other when the first casing part and the second casing part are coupled together.

4. The casing for the mobile electronic device of claim 1, wherein the buffer layer has an amount of area larger than 80% of the area of the outer layer.

5. A protective shell, applicable for covering a mobile electronic device having a casing, the protective shell comprising:
   a first casing part and a second casing part, each of the first casing part and second casing part being movably connected to each other;
   the first casing part and the second casing part, comprising:
      an outer layer having a first side exposed to the outside, and a second side opposite to the first side;
      a flexible buffer layer having a first side connected to the second side of the outer layer, and a second side opposite to the first side of the buffer layer; and
      a layer for holding, the holding layer having a first side connected to the second side of the buffer layer, and a second side for covering the casing of the mobile electronic device,
   wherein each of the holding layers of the first casing part and the second casing part has a fixing member, and the fixing member of each of the first casing part and second casing part is configured to be inserted through a hole on a circuit board to connect to the fixing member of an opposing casing part of the first casing part and the second casing part, such that the circuit board is firmly held between the first casing part and the second casing part.

6. The protective shell of claim 5, wherein each of the outer layer and the holding layer has hardness greater than that of the buffer layer.

7. The protective shell of claim 5, wherein the buffer layer of the first casing part and the buffer layer of the second casing part closely fit each other when the first casing part and the second casing part are coupled together.

8. The protective shell of claim 5, wherein the buffer layer has an amount of area larger than 80% of the area of the outer layer.

* * * * *